March 14, 1961     K. H. STOKES     2,974,755
DAMPENING APPARATUS
Filed Oct. 1, 1957
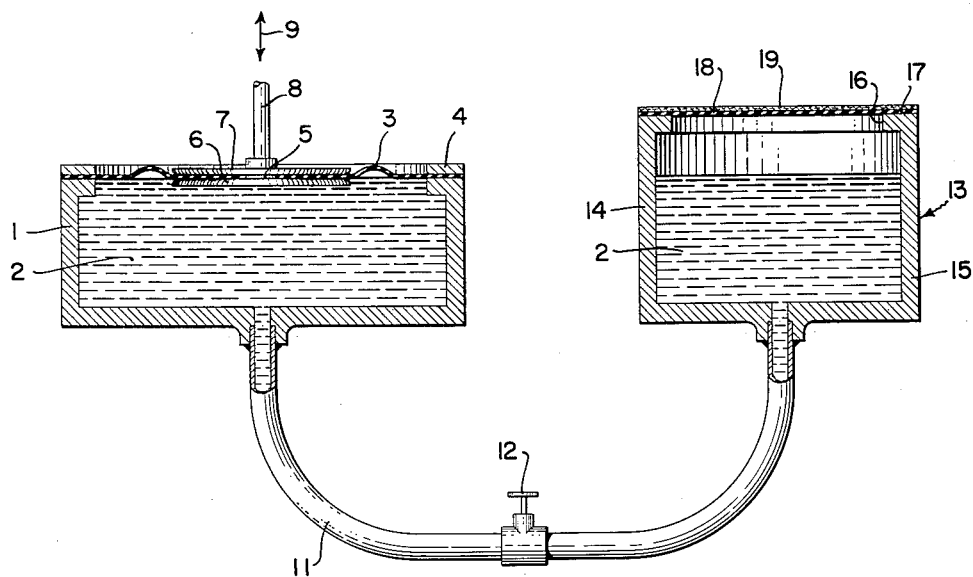
INVENTOR.
KONRAD H. STOKES
BY *Arthur H. Swenson*
ATTORNEY.

2,974,755
DAMPENING APPARATUS

Konrad H. Stokes, Ambler, Pa., assignor to Minneapolis-Honeywell Regulator Company, Minneapolis, Minn., a corporation of Delaware Filed Oct. 1, 1957, Ser. No. 687,452

3 Claims. (Cl. 188—100)

An object of the present invention is to provide an apparatus to dampen out any undesirable vibrations or oscillations from any object, such as may be present in a force balanced or motion balanced instrument to which it is connected.

Another object of the present invention is to disclose a sealed dash pot whose dampening action will not be adversely affected when the volume of the fluid within the dash pot is changed due to a change in ambient temperature.

Still another more specific object of the present invention is to provide the aforementioned dashpot with an atmospheric exhaust membrane member which will negate the effect that a change in ambient temperature has on the volume of the dampening fluid retained within the dashpot.

Still another object of the present invention is to provide an atmospheric exhaust membrane member of the aforementioned type for a dashpot which member is made of such a material that it will permit the passage of air through this member as changes in barometric pressure take place.

Still another object of the present invention is to provide the liquid in a dashpot with an enclosure that will prevent dust particles that are present in the atmosphere from entering the dashpot or the liquid contained therein from leaving same.

A better understanding of the present invention may be had from the following detailed description when read in connection with the accompanying drawing in which:

The single figure shows an elevation view of a midsection of the sealed dashpot.

This dashpot is shown having a cylindrical dampening chamber 1 containing a suitable dampening fluid 2 which possesses a low coefficient of expansion and which preferably contains an ingredient such as glycerin which will prevent it from freezing. A lower perpheral surface of the flexible diaphragm 3 is shown bonded by a suitable bonding material or a commercially available cement material to the upper surface of the chamber.

The upper peripheral surface of the diaphragm 3 is also shown bonded by means of a suitable bonding or cement material to a retaining ring 4. The diaphragm 3 has a cylindrical aperture 5 located at its central portion. Attached in any suitable sealed relationship to the portion of the diaphragm 3 that surrounds the aperture 5 there is shown two clamping discs 6 and 7. Each of these discs 6 and 7 are shown connected to a transmitting link member 8. Although not shown the other end of this link may be connected to any operable part of an object such as a movable part of a force or motion balanced instrument from which it is desired to remove undesirable vibrations and/or oscillations. An arrow 9 shown immediately above member 8 indicates the type of vibrations and/or oscillations that are being transmitted through the link member 8 to the dampening apparatus.

The bottom portion of the dampening chamber 1 has shown fixedly attached thereto a fluid passageway in the form of a conduit 11. The portion of the conduit midway between its ends is shown containing an adjustable restriction 12 to adjust the rate at which a flow of the dampening fluid can pass therethrough. The right end of the conduit is shown fixedly attached and opening into a reservoir 13. The liquid 2 in the chamber 1 is shown connected to the reservoir by means of the conduit 11. The height of the level of the liquid in this reservoir is at the same level as the other upper surface of this liquid that is shown in contact with the diaphragm 3 in the chamber 1. The shape of the reservoir 13 may be of a hollow rectilinear configuration whose width is the distance shown in the drawing between the side walls 14 and 15.

The upper surface of reservoir 13 is shown having an aperture 16 formed therein which may be of a cylindrical shape configuration. The upper outer peripheral surface 17 of the reservoir 13, containing the aforementioned aperture 16 is shown having bonded or cemented thereto the peripheral portion of a very thin piece of polytetrafluoroethylene commercially available under the mark of Teflon 18. The upper outer peripheral surface of this polytetrafluoroethylene member 18 is shown having bonded or cemented thereto a very thin piece of leather 19.

From the aforementioned description of the apparatus it can be seen that when undesired vibrations or oscillations occur in an object that may be connected to the upper end of the transmitting link member 8 these undesirable motions will be transmitted through the discs 6 and 7 and the diaphragm 3 to the liquid 2. As these undesired motions are transmitted to the liquid in this manner the liquid will buck out or in other words dampen these undesirable motions.

Should the temperature of the atmosphere surrounding the dashpot be increased the dampening fluid 2 will expand and take up a greater amount of space that is within the confines of the dashpot than it had occupied before the expansion took place. Due to this action the pressure that will then be acting on the lower surface of the flexible member 3 would normally be increased and cause undesired movements to be transmitted to link 8.

However as previously mentioned it is one of the objects of the present invention to provide an enclosed dashpot whose dampening action will not be adversely affected when the volume of the fluid within the dashpot is changed due to this change in ambient temperature. This is accomplished by making the atmospheric exhaust members 18 and 19 of a material through which the air in the space above the liquid in the reservoir 13 may pass as the original volume occupied by the air is reduced when the aforementioned increase in the volume of the liquid 2 in this reservoir takes place.

It can therefore be seen that no pressure build up will take place in the air space above the liquid in the reservoir 13 as the air in this space is compressed by the liquid 2 during an increase in ambient temperature. Since no pressure build up can thus take place no erratic unsatisfactory dampening performance will occur as has been the case in other types of dashpots that have been used prior to the present invention.

From the aforementioned description of this dampening apparatus it can also be seen that if the changes in the pressure of the air in the atmosphere surrounding the dashpot occur the same changes in pressure of the air within the dashpot will simultaneously take place because such changes in air pressure can, at that time, readily be transmitted through the exhaust member 18, 19.

Such an arrangement will thus retain the pressure on either side of the exhaust member 18, 19 at a constant value. The dashpot presented in this application thus provides a unique member 18, 19 that will permit a barometric pressure change to take place in the air that surrounds the dashpot while a similar pressure change can simultaneously take place in the air within the dashpot. Because of the aforementioned desired pressure equalizing action that the member 18, 19 provides it can thus be seen that when an increase in barometric pressure occurs on the external surface of the flexible diaphragm 3 and the liquid 2 is forced to move in a downward direction within the dampening chamber 1 and in an upward direction in the reservoir 13 the air then in the space above the liquid in this reservoir will not stop the rise of liquid in the reservoir from taking place. Thence, no undesirable reactive force will be applied to the underside of flexible member 3 as has heretofore been the case with enclosed dashpots that have previously been used prior to the one disclosed in this application.

Finally, it can be concluded from the above description that although air is permitted to pass through the exhaust members 18 and 19 this exhaust member will not permit the dampening liquid retained by the dashpot to pass therethrough. The reason for this is that liquids cannot penetrate through a thin layer of polytetrafluoroethylene 18 from which the exhaust member is constructed.

It can thus be seen that the present invention provides an enclosed dashpot for securely retaining a dampening liquid therein whose performance is neither affected by volume changes that take place in its dampening fluid due to changes in ambient temperature nor affected by barometric pressure changes.

What is claimed is:

1. An ambient temperature and barometric pressure compensated enclosed dash pot to dampen out unwanted vibrations in an object to which the dash pot is connected, comprising a link connected at one end to said object and at its other end to a diaphragm forming an upper flexible wall of a first cylindrical chamber, a second chamber positioned adjacent said first chamber, a conduit containing an adjustably fixed restriction connecting the inner bottom portion of said first chamber with the inner bottom portion of said second chamber, said first and second chambers and said conduit being operably positioned so that a dampening liquid contained therein will normally completely fill said first chamber and said pipe and partially fill said second chamber, said second chamber containing an upper wall portion through which air on same may be transmitted therethrough but through which said liquid cannot penetrate and said upper wall portion of said second chamber is comprised of a thin piece of leather bonded to the top peripheral surface of a thin piece of polytetrafluoroethylene.

2. An ambient temperature and barometric pressure compensated enclosed dash pot, comprising a dampening chamber, a conduit to transfer a damping liquid between a partially filled reservoir and said damping chamber, an adjustably fixed restriction in said conduit, said top of said reservoir being enclosed with an atmospheric exhaust member through which air within or external to said reservoir may pass but through which said liquid cannot penetrate and wherein said exhaust member is comprised of a thin sheet of leather bonded to the top surface of a thin sheet of polytetrafluoroethylene.

3. An ambient temperature and barometric pressure compensating apparatus to maintain the pressure drop across a flexible wall of an enclosed dash pot at a constant value during a change in barometric pressure, comprising a thin polytetrafluoroethylene-leather clad sheet forming a part of a completely enclosed wall portion of a partially filled liquid reservoir of said dash pot and wherein said sheet is impervious to said liquid and provides a means by which air can flow into and out of said dash pot to maintain said pressure drop at a constant value during changes in barometric pressure.

References Cited in the file of this patent

UNITED STATES PATENTS

| | | |
|---|---|---|
| 1,692,227 | Segeler | Nov. 20, 1928 |
| 1,855,064 | Messier | Apr. 19, 1932 |
| 2,298,938 | Griffin et al. | Oct. 13, 1942 |
| 2,446,901 | Blaisdell et al. | Aug. 10, 1948 |
| 2,453,192 | Bryant | Nov. 9, 1948 |
| 2,541,838 | Shardlow | Feb. 13, 1951 |
| 2,628,692 | Hufferd | Feb. 17, 1953 |
| 2,807,457 | Brueder | Sept. 24, 1957 |

FOREIGN PATENTS

| | | |
|---|---|---|
| 482,402 | France | Dec. 22, 1916 |